May 30, 1933.  O. L. BOCK  1,911,941
DRAFT REGULATOR
Filed Oct. 30, 1930
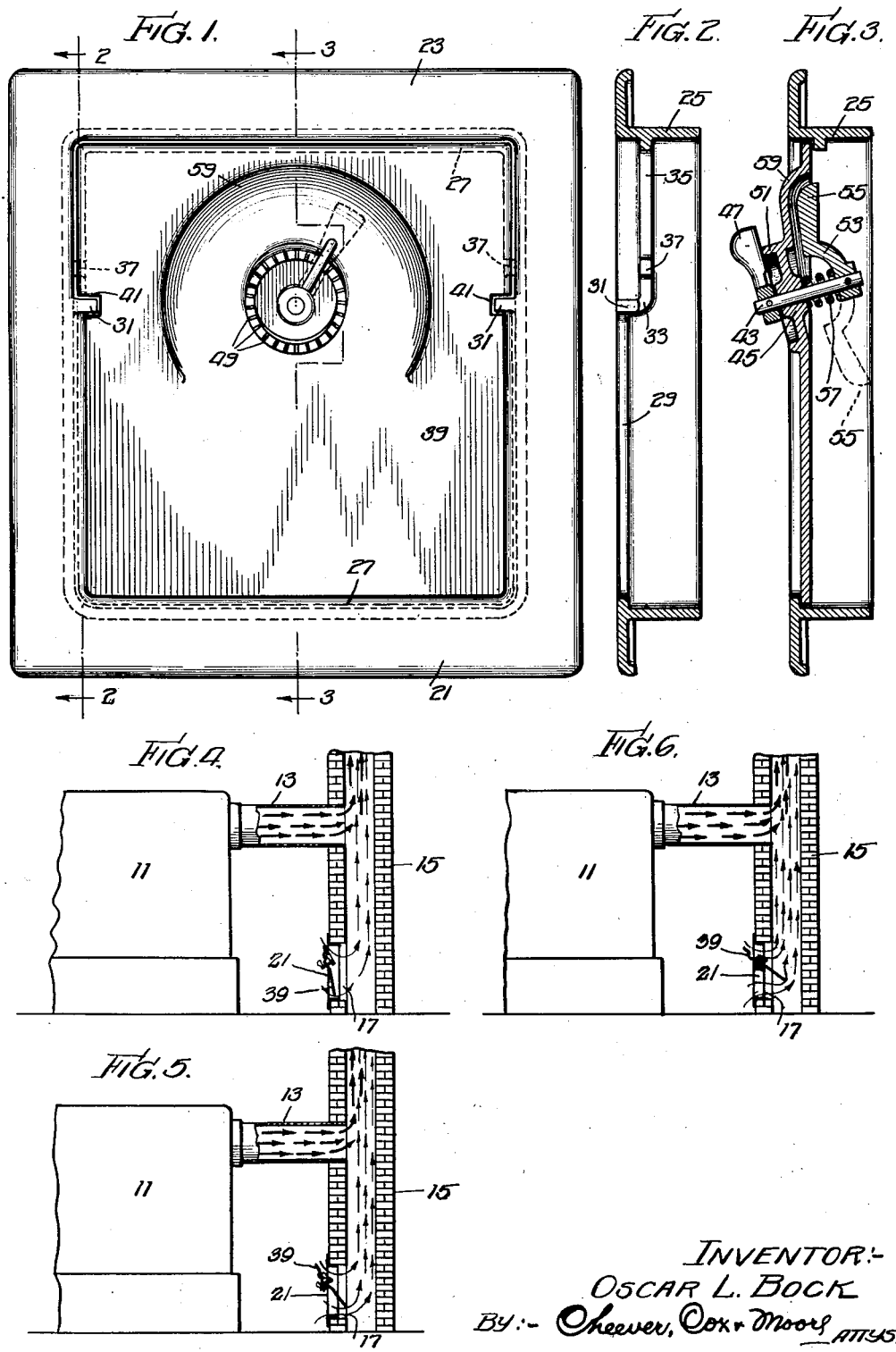
INVENTOR:-
OSCAR L. BOCK
BY:- Cheever, Cox & Moore ATTYS Patented May 30, 1933

1,911,941

UNITED STATES PATENT OFFICE

OSCAR L. BOCK, OF MADISON, WISCONSIN

DRAFT REGULATOR

Application filed October 30, 1930. Serial No. 492,226.

My invention relates in general to draft regulator for furnaces and the like, and has more particular reference to a combination draft regulator and cleanout door.

It has long been recognized that furnace efficiency depends upon the uniformity of the draft through the heating plant. A varying draft alternately creates excess air conditions and air deficiency conditions, with the result that proper fuel combustion is not obtained. As a result, numerous attempts have heretofore been made to control the flow of air through the combustion chamber at an absolutely constant rate.

One of the objects of my present invention is to provide an automatic draft regulator of novel construction, which regulator is neat and compact and operates efficiently and automatically to maintain a constant draft through the heating plant to which it is applied, regardless of the severity or suddenness of the atmospheric changes or changes in weather conditions.

Another important object is to provide a draft regulator so positioned in the smokestack of a furnace or similar device as to be out of the direct path of heated gases discharged from the furnace.

Another important object of my present invention is to provide a combination draft regulator and cleanout door whereby the same smokestack opening may be utilized to remove the sooty accumulations and also to provide regulated ingress of air into the chimney, so that a constant draft may be maintained through the fuel box under all atmospheric conditions.

Another important object of my present invention is to provide a draft regulator of simple construction and positive operation, which may be assembled in the cleanout opening of a furnace flue and which operates in a rugged, satisfactory manner.

Another important object of my present invention is to provide a draft regulator for mounting in the cleanout opening of a furnace flue.

Still another important object of the invention is to provide an adjustable draft regulator having features of novelty.

A still further object of my invention is to provide a draft regulator having adjustable means comprising an eccentric weight whereby to adjust the regulator to control the draft through the fire-box of the furnace, to which the regulator may be applied.

Yet another important object of my invention is to provide a draft regulator including a frame providing an opening, and a shutter removably hinged in said opening, whereby the shutter may be removed and the opening used for cleanout purposes.

Numerous other objects and advantages of my invention will be apparent, as it is more clearly understood from the following description, which, taken in connection with the accompanying drawing, described a preferred embodiment of my invention.

Referring to the drawing:

Figure 1 is a front view in perspective of a device embodying my present invention.

Figure 2 is a vertical cross-section taken substantially along the line 2—2 in Figure 1.

Figure 3 is a vertical cross-section taken substantially along the line 3—3 in Figure 1.

Figures 4, 5, and 6 are diagrammatic representations of a furnace and its flue, showing the relative position of my improved draft regulator, the several views consecutively illustrating the mode of operation of the device of my present invention.

To illustrate my invention I have shown on the drawing a furnace 11 which may be of any convenient, suitable or ordinary construction, having a smokestack or flue 13 opening into a chimney 15. The flue and chimney may be of any preferable or suitable construction, but for the purpose of illustrating my invention I have shown the flue 13 as comprising a sheet metal pipe, the chimney 15 being illustrated as of brick construction. At or near the lower end of the chimney 15 an opening 17 is provided. This opening is or may be the ordinary cleanout opening, which is usually provided with an imperforate door for the purpose of removing accumulations of soot from the base of the chimney.

My improved draft regulator is preferably mounted in the opening 17. The combination draft regulator and cleanout door of my present invention comprises a frame 21 comprising an annular flanged member which may conveniently be produced as an iron casting, but which of course may be formed in any other suitable or convenient manner. The frame 21 is formed with an outwardly extending flange 23, which said flange is adapted to overlie the face of the chimney around the edges of the opening 17. The frame 21 is also formed with an inwardly extending flange 25 configured to fit into and engage the sides of the opening 17. The frame, of course, may be secured in the opening in any suitable manner, such as by using cement to bed it in place.

The inner surface of the annular flange 25 is provided with a bead or rudimentary flange 27 extending inwardly. The bead 27 comprises two portions. The lower portion 29 extends along the lower edge of the opening defined by the frame 21, and extends inwardly of the annular flange 25 as a continuation of and flush with the outwardly extending flange 23. The portion 29 extends along the bottom edge of the opening and along the sides of the frame approximately two-thirds of their length to registering points at which the flange is extended inwardly in the form of registering projections 31 in the opposite sides of the frame.

From the projection 31 the flange 27 extends rearwardly to a point 33 in the frame spaced behind the front face thereof, a distance slightly more than two times the width of the part 27. Thence the portion 35 of the flange 27 extends upwardly along the inner face of the annular flange 25 and across the top of the frame. This flange portion 35 is notched out as at 37 in opposite sides of the frame at a point spaced above the point 33.

The registering notches 37 are wide enough to receive a shutter 39, which is adapted for detachable arrangement in the frame 21. The shutter 39 comprises a plate which may be cast from any suitable moldable material such as iron, aluminum, and the like, and is formed of a size and peripheral configuration to fit snugly within the annular flange 25.

The sides of the plate 39 are notched as at 41. The plate may be interlockingly and pivotally assembled in the frame 21 by turning the plate to a horizontal position, face downwardly, and inserting it edgewise through the registering notches 37, until the notched portions 41 of the plate register with the flange portion 35, at which time the plate may be moved bodily downwardly until the notched portions 41 thereof receive the inward projection 31 at the upper end of the bead portion 29. The upper edges of the notches 41 then rest upon the upper surfaces of the projections 31 so that the plate will be pivotally supported thereon.

The peripheral edges of the plate below the notched portion 41 will lie behind the flange portion 29, and will thereby be prevented from swinging forwardly beyond a vertical position in the frame, while the edges of the plate 39 above the notches 41 extend in front of the flange portion 35 and are thereby prevented from swinging rearwardly from a vertical position in the frame. The upper portions of the plate, however, may be tilted forwardly, and the lower portions rearwardly about the projections 31 as pivoted.

It is obvious that when such a device is arranged in the opening 17, the vacuum which occurs in the bottom of the chimney will cause the draft regulator to swing inwardly and admit air into the lower portions of the chimney, as illustrated in Figures 4, 5, and 6. This air, passing upwardly, will mingle with the products of combustion entering the chimney through the flue 13, and will thence pass upwardly and out of the stack.

In order to provide means for regulating the flow of air into the bottom of the chimney through the regulator, the plate 39 is provided preferably centrally and in alignment with the notches 41, with a perforation adapted to receive a shaft 43, the perforation being provided with bosses on opposite sides of the plate, whereby to provide a journal 45 for supporting the shaft 43.

The outer end of the shaft 43 carries an operating handle 47, the inner edge of which is formed to engage a plurality of notches 49 formed in the outer edge of an annular bead 51, which in turn is formed integrally with and extends outwardly of the plate. By arranging the handle 47 in any one of the notches 49, any desired relatively angular position of the shaft 43 with respect to the plates 39 may be preserved. The inner end of the shaft 43 is provided with an arm 53, the outer end of which is formed as a counterweight 55.

Between the arm 53 and the journal 45 a spring 57 is provided. This spring encircles the shaft 43 and bears at its opposite ends upon the bearing 45 and the arm 53, so as to normally urge the shaft 43 inwardly through the bearing 45 and thus resiliently urge the operating handle 47 against the notched bead 51.

The journal 45 is formed in the plate 39 so that the shaft 43 does not extend at right angles to the plane of the plate, but rather extends inwardly and upwardly at an angle to the plate, and the plate is provided with a formation 59 forming an upwardly projecting depression in which the counterweight 55 may be received when the handle 47 is adjusted to position the weight 55 upwardly of the shaft 43.

It is obvious that when the weight 55 is in the upward position illustrated in Figure 3 of the drawing, that air will be much more easily drawn past the shutter 39 through the draft regulator than when it is in the downward position illustrated in dotted lines in Figure 3, since the center of gravity of the assembly comprising the handle 47, the shaft 43 and the counterweight 55 is slightly in front of the point about which the shutter 39 is pivoted; whereas when the weight is in the downward position, the center of gravity of said assembly is behind the point about which the shutter is pivoted, and consequently resists any opening movement of the shutter.

When it is desired to exert a greater draft through the furnace, the adjusting handle 47 is turned to the downward position, and when a lesser draft is required, the adjusting handle 47 is moved to the upward position shown in Figure 3. Various adjustments between maximum and minimum may be accomplished by turning the adjusting handle to intermediate positions.

The diagrammatic representations, Figures 4, 5, and 6, illustrate a device embodying my present invention under various atmospheric conditions. Figure 4 illustrates the operation of the device under conditions where there is little wind, and the atmosphere is foggy or muggy, and the barometric pressure is low. The excess draft over that required by the fire-box is slight, and the average position of the draft regulator is only slightly open to take care of the excess draft. When the weather becomes increasingly fine, a breeze springs up, and the sun comes out, the barometric pressure rises, consequently the excess draft over that required by the furnace is larger, and the control shutter 39 of the draft regulator opens more widely to take care of the increased draft. Under these operating conditions the fluctuations of the draft are somewhat greater than those which prevail under the conditions illustrated in Figure 4, but the delicate pivoting of the shutter provided by the construction of my present invention permits the shutter to operate immediately so as to compensate for every extra puff of wind.

Figure 6 illustrates conditions existing during periods of excessively high winds, which create enormous excess draft requirements. Under these conditions it is impossible to properly control the furnace with ordinary draft and temper arrangements such as have been provided heretofore. However, the device of my present invention opens still more widely, admitting all necessary excess air directly into the chimney, and thus preventing the excess draft from being exerted in the furnace, and the heat units which otherwise would be drawn out of the furnace by this excess draft are held back, and this feature results in an enormous saving in fuel.

It should be noted that the device of my invention provides a substantially constant draft across and through the furnace under varying atmospheric conditions, the excess draft being compensated accurately and completely by the provision of my improved draft regulator in the bottom of the chimney.

When it is desired to remove soot and other accumulations from the bottom of the chimney, all that is necessary is to remove the shutter 39 by reversing the assembly sequence. When the shutter 39 is removed, the opening of course may be used as a clean-out opening, since there is no other obstruction than the shutter plate 39 mounted therein.

In addition to the advantage of combining the regulator and clean-out door, the device of my present invention presents numerous advantages. It is of extremely simple construction, lending itself readily to cheap production. The parts, however, are of rugged design and construction, and therefore the device will not easily break down in service. The design, wherein the shutter is delicately pivoted, renders the regulator extremely sensitive, so that sudden changes in atmospheric conditions will not affect the draft across the furnace. Another feature of advantage resides in the manner of pivoting the plate, whereby the aforesaid sensitive operation is accomplished.

Still another feature is the novel arrangement whereby the pivoted plate may be readily removed, so that the opening in which it is mounted can be used for clean-out purposes.

These and numerous other objects and advantages are thought to be clearly apparent from the foregoing description, and it is obvious that numerous changes may be made in the form, construction, and arrangement of the several parts, without departing from the spirit or scope of my invention, or sacrificing any of its numerous advantages, the form hereinbefore described being a preferred embodiment for the purpose of illustrating my invention.

Having thus described my invention, what I claim as new and desire to secure by Letters Patent is:

1. A draft regulator comprising a frame, a shutter pivotally mounted in the frame, means to regulate the swinging of the shutter, said means comprising a shaft journaled in the shutter at an angle to the plane of the shutter and carrying an eccentric weight mounted for rotation with said shaft and means for rotating said shaft whereby the weight may be shifted toward and away from the plane of the shutter.

2. A draft regulator comprising a frame, a shutter pivotally mounted in the frame to swing about a horizontal axis in response to variations in the air pressure on one side of the shutter and means to regulate the swinging of the shutter, said means comprising a shaft journaled in the shutter at an angle to the plane of the shutter and carrying an eccentric weight mounted for rotation with said shaft and means for rotating said shaft whereby the weight may be shifted toward and away from the plane of the shutter, whereby to effect the inertia of the shutter about its axis of rotation.

3. A draft regulator comprising a frame and a shutter pivotally mounted in said frame, said frame being provided with an inwardly extending bead in its opposite walls, the upper portions of said bead being out of alignment behind the lower portions of said bead and having a horizontal interconnecting portion, the upper portions of said bead being provided with registering notches and said plate having a pair of registering notches formed in its opposed edges, said plate being adapted for edgewise insertion between the notched portions of said bead and positionable with its notches embracing the intermediate horizontal portion of the bead, whereby the shutter is pivotally yet removably mounted to the frame with its lower portions behind the lower portions of the bead and its upper portions in front of the upper portions of the bead.

4. A draft regulator comprising a frame, a plate pivotally mounted in said frame, said plate having a journal formed therein, a shaft mounted in said journal, said journal being formed to support the shaft at an angle to the plane of the plate, said plate being configurated above said journal to provide a recess, an eccentric weight mounted for rotation on the shaft, means for rotating the shaft whereby to position the weight at a distance from the plane of the plate or to arrange the weight in the depression and substantially in the plane of the plate or alternately.

5. A draft regulator comprising a frame, a plate pivotally mounted in said frame, said plate having a journal formed therein, a shaft mounted in said journal, said journal being formed to support the shaft at an angle to the plane of the plate, said plate being configurated above said journal to provide a recess, an eccentric weight mounted for rotation on the shaft, means for rotating the shaft whereby to position the weight at a distance from the plane of the plate or to arrange the weight in the depression and substantially in the plane of the plate, said means comprising a handle mounted to the forward end of said shaft and adapted to swing over the front of the plate, said plate being provided with an annular notched ridge adapted to engage the handle and resilient means normally urging the shaft inwardly of the plate whereby to resiliently urge the operating handle into engagement upon the notched ridge.

6. A draft regulator comprising a frame, a plate mounted in said frame and co-operating means formed in the plate and frame whereby the plate is detachably and interlockingly secured in the frame for rotation about an axis intermediate the opposed edges of the plate, said frame having opposed edges provided with vertical extending beads having an upwardly facing bearing portion, said beads being cutaway at points spaced above said bearing portions to receive the opposed edges of the plate to permit insertion of the same edge-wise therebetween, said plate having opposed registering notches in the edges thereof adapted to register with and receive the beads after the plate has been inserted edgewise a pre-determined distance whereby to permit the notched portions of the plate to be shifted downwardly on the beads to a position engaging the bearing portion in order to provide a tilting relationship between the plate and the frame, said bead being adapted to inter-lockingly engage the notched edges of the plate after the same has been assembled in the frame as aforesaid.

7. A draft regulator comprising a frame, a plate mounted in said frame and co-operating means formed in the plate and frame whereby the plate is detachably and inter-lockingly secured in the frame for rotation about an axis intermediate the opposed edges of the plate, said frame being formed with an edge providing a vertically extending bead having a notch and a horizontal bearing portion below the notch whereby the plate may be inserted edgewise in the notch, the edge of the plate being also notched to receive the flange of the frame so that the plate may be moved along the flange from the notched portion thereof to the horizontal bearing portion in position to be tiltably supported by said bearing portion.

8. A draft regulator comprising a frame member, a plate member mounted on said frame member and co-operating means formed in the plate member and frame member whereby the plate member may be detachably and interlockingly secured in the frame member for rotation about an axis intermediate the opposed top and bottom edges of the plate member, one of said members being provided with registering slots in its opposite sides and oppositely projecting flanges on the opposite sides of the other member and adapted to be received in the slots whereby to provide a pivotal relationship between the members, said flanges including portions having registering notches and adjacent horizontal portions into which the notched portions merge whereby the slotted edges of one member may be inserted between the registering notches of the other member to register the slots with the notches and thereafter shifting the slotted portions along the flanges into position engaging the horizontal portions.

9. A draft regulator comprising a frame, a plate mounted in said frame and co-operating means formed in the plate and frame whereby the plate is detachably and interlockingly secured in the frame for rotation about an axis intermediate the opposed edges of the plate, said frame having a flanged portion in an edge thereof comprising an upper portion having a notch and a lower horizontal portion and said plate having an edge having a slot and adapted to enter the notch edgewise to position the slot to receive the flange of the frame whereby to permit the slotted portion to move downwardly onto the horizontal flange portion.

10. A draft regulator comprising a frame and a shutter pivotally mounted in said frame, said frame being provided with an inwardly extending bead in its opposite walls, the upper portions of said bead being out of alignment behind the lower portions of said bead and having a horizontal interconnecting portion, the upper portions of said bead being provided with registering notches and said plate having a pair of registering notches formed in its opposed edges, said plate being adapted for edge-wise insertion between the notched portions of said bead and positionable with its notches embracing the intermediate horizontal portion of the bead, whereby the shutter is pivotally yet removably mounted to the frame with its lower portions behind the lower portions of the bead and its upper portions in front of the upper portions of the bead, and a weight shiftable on said shutter toward and away from its axis of rotation in the frame.

11. A draft regulator comprising a frame and a shutter pivotally mounted in said frame, said frame being provided with an inwardly extending bead in its opposite walls, the upper portions of said bead being out of alignment behind the lower portions of said bead and having a horizontal interconnecting portion, the upper portions of said bead being provided with registering notches and said plate having a pair of registering notches formed in its opposed edges, said plate being adapted for edge-wise insertion between the notched portions of said bead and positionable with its notches embracing the intermediate horizontal portion of the bead, whereby the shutter is pivotally yet removably mounted to the frame with its lower portions behind the lower portions of the bead and its upper portions in front of the upper portions of the bead, a weight mounted on said shutter approximately at the axis of rotation of the shutter in the frame and means to shift the weight on the shutter into positions above and below said axis.

12. A draft regulator comprising a frame and a shutter pivotally mounted in said frame, said frame being provided with an inwardly extending bead in its opposite walls, the upper portions of said bead being out of alignment behind the lower portions of said bead and having a horizontal interconnecting portion, the upper portions of said bead being provided with registering notches and said plate having a pair of registering notches formed in its opposed edges, said plate being adapted for edge-wise insertion between the notched portions of said bead and positionable with its notches embracing the intermediate horizontal portion of the bead, whereby the shutter is pivotally yet removably mounted to the frame with its lower portions behind the lower portions of the bead and its upper portions in front of the upper portions of the bead, a shaft journalled on said plate, an eccentric weight carried on said shaft and means to rotate the shaft to shift the weight with respect to the shutter.

13. A draft regulator comprising a frame and a shutter pivotally mounted in said frame, said frame being provided with an inwardly extending bead in its opposite walls, the upper portions of said bead being out of alignment behind the lower portions of said bead and having a horizontal interconnecting portion, the upper portions of said bead being provided with registering notches and said plate having a pair of registering notches formed in its opposed edges, said plate being adapted for edgewise insertion between the notched portions of said bead and positionable with its notches embracing the intermediate horizontal portion of the bead, whereby the shutter is pivotally yet removably mounted to the frame with its lower portions behind the lower portions of the bead and its upper portions in front of the upper portions of the bead and means to regulate the swinging of the shutter, comprising a shaft journalled in the shutter substantially at the axis of rotation of the shutter in the frame, a weight operatively connected to said shaft behind said shutter and means operable from in front of said shutter for actuating the shaft to shift the weight toward and away from said axis.

14. In a draft control device, the combination of a damper pivoted to swing on a substantially horizontal axis disposed above its center, an arm mounted on the inner side of said damper to swing about the center of the damper as an axis for varying the position of the center of gravity of said damper relative to said first mentioned axis, and a manually operable arm outside of said damper secured for turning movement with said inner arm and extending radially to a position adjacent the periphery of the damper.

15. In a draft controller comprising a damper mounted to swing about a pivotal axis disposed at an angle to the vertical, an adjustable counter-balancing arm providing a center of gravity located on one side of said axis and pivoted to said damper on the other side of said axis, whereby said center of gravity is mounted for shifting movement from a point opposite and spaced from the approximate median of the damper axis to a point adjacent to and near one end of said damper axis.

16. A draft controller comprising a damper having a transverse pivotal axis located eccentrically thereof and disposed at an angle to the vertical, an adjustable counterbalancing weight mounted on the inner side of the damper for pivotal movement whereby to shift the center of gravity of said weight toward and away from said axis, and a manually operable arm on the outer side of said damper connected to said weight to shift the same and extending across the face of said damper so that movement of the free end of said arm through a given distance produces a substantially smaller movement of said center of gravity transversely of said axis.

17. A draft regulator comprising a frame, a shutter pivotally mounted in the frame, said shutter having a perforation therethrough substantially on its axis of rotation, means to regulate the swinging of the shutter, said means comprising a shaft journaled in said perforation, a weight on said shaft behind said shutter, a handle on said shaft in front of the shutter, said handle having an edge facing the shutter, said shutter being formed with a notched ridge registering with said edge, and resilient means normally urging the shaft longitudinally in the perforation to cause said edge to engage the notched ridge whereby the weight may be adjusted toward and away from the axis of the shutter and latched in adjusted position.

In witness where, of I have hereunto subscribed my name.

OSCAR L. BOCK.